US012744650B2

(12) United States Patent
Abdelghaffar et al.

(10) Patent No.: US 12,744,650 B2
(45) Date of Patent: Sep. 22, 2026

(54) CSI RESOURCES AND REPORT CONFIGURATION FOR FULL DUPLEX CHANNELS

(71) Applicant: QUALCOMM Incorporated, San Diego, CA (US)

(72) Inventors: Muhammad Sayed Khairy Abdelghaffar, San Jose, CA (US); Alexandros Manolakos, Escondido, CA (US); Yu Zhang, San Diego, CA (US); Tingfang Ji, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 625 days.

(21) Appl. No.: 17/997,528

(22) PCT Filed: Jun. 9, 2020

(86) PCT No.: PCT/CN2020/095058
§ 371 (c)(1),
(2) Date: Oct. 28, 2022

(87) PCT Pub. No.: WO2021/248299
PCT Pub. Date: Dec. 16, 2021

(65) Prior Publication Data
US 2023/0198725 A1 Jun. 22, 2023

(51) Int. Cl.
*H04L 5/00* (2006.01)
*H04B 7/06* (2006.01)
*H04L 5/14* (2006.01)

(52) U.S. Cl.
CPC ......... *H04L 5/0057* (2013.01); *H04B 7/0626* (2013.01); *H04L 5/14* (2013.01)

(58) Field of Classification Search
CPC ........ H04L 5/0057; H04L 5/14; H04B 7/0626
See application file for complete search history.

(56) References Cited

U.S. PATENT DOCUMENTS 11,177,917 B2 11/2021 Manolakos et al.
2015/0109969 A1* 4/2015 Celebi .................. H04L 5/1461 370/278

(Continued)

FOREIGN PATENT DOCUMENTS

CN 108476425 A 8/2018
CN 110268667 A 9/2019

(Continued)

OTHER PUBLICATIONS

Supplementary European Search Report—EP20940092—Search Authority—The Hague—Feb. 26, 2024.

(Continued)

*Primary Examiner* — Jackie Zuniga Abad
(74) *Attorney, Agent, or Firm* — QUALCOMM IP DEPT.; James Hunt Yancey, Jr.

(57) ABSTRACT

A base station may configure a user equipment for reporting channel state information for non-contiguous downlink channels such as sub-band full duplexed downlink channels. The user equipment may report the channel state information for the non-contiguous downlink channels utilizing a single channel state information report.

35 Claims, 15 Drawing Sheets

(56) References Cited

U.S. PATENT DOCUMENTS

| | | | | |
|---|---|---|---|---|
| 2016/0330004 | A1 | 11/2016 | Kim et al. | |
| 2019/0165896 | A1* | 5/2019 | Huang | H04L 1/1664 |
| 2019/0222283 | A1 | 7/2019 | Yum et al. | |
| 2019/0261244 | A1* | 8/2019 | Jung | H04L 5/0048 |
| 2019/0335427 | A1* | 10/2019 | Sun | H04W 24/10 |
| 2020/0052861 | A1* | 2/2020 | Li | H04L 5/0051 |
| 2020/0112355 | A1* | 4/2020 | Park | H04B 7/0626 |

FOREIGN PATENT DOCUMENTS

| | | | |
|---|---|---|---|
| CN | 110741595 | A | 1/2020 |
| EP | 3110049 | A1 | 12/2016 |
| WO | 2019032642 | A1 | 2/2019 |

OTHER PUBLICATIONS

Ericsson: “Simulation Results of CSI-RS Based PMI Reporting Test”, 3GPP TSG-RAN WG4 Meeting #94-e-Bis, R4-2004019, Electronic Meeting, Apr. 20-30, 2020, pp. 1-5, The Whole Document.

International Search Report and Written Opinion—PCT/CN2020/095058—ISA/EPO—Mar. 9, 2021.

* cited by examiner

One Frame (TDD)
10 ms
200
subframe
RB
slot
D D D D D D D D D D D D F U
subcarrier
OFDM symbol
slot
DMRS $R_x$
CSI-RS
230
PDCCH
SSS
PSS
PDSCH
PBCH
BWP
20 RBs
SS/PBCH Block
channel bandwidth RBs
One Frame (TDD)
10 ms
250
subframe
RB
slot
D F U U U U U U U U U U U U
subcarrier
OFDM symbol
slot
SRS
SRS Comb 0
SRS Comb 1
DMRS R
280
PUCCH
PUSCH

CSI RESOURCES AND REPORT CONFIGURATION FOR FULL DUPLEX CHANNELS

CROSS REFERENCE TO RELATED APPLICATION(S)

This application is a National Phase entry of PCT Application No. PCT/CN2020/095058, entitled "CSI RESOURCES AND REPORT CONFIGURATION FOR FULL DUPLEX CHANNELS" and filed on Jun. 9, 2020, which is expressly incorporated by reference herein in its entirety.

BACKGROUND

Technical Field

The present disclosure relates generally to communication systems, and more particularly, to a full duplex wireless communication system.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The UE may receive, from a base station, a full duplex (FD) downlink channel, the FD downlink channel being duplexed with a second FD channel, wherein the second FD channel has carrier frequencies between carrier frequencies of a first portion of the FD downlink channel and carrier frequencies of a second portion of the FD downlink channel; receive, from the base station, a channel state information reference signal (CSI-RS) on resources of the first portion of the FD downlink channel having a first symbol and on resources of the second portion of the FD downlink channel having the first symbol; and transmit, to the base station, a channel state information (CSI) report based on the CSI-RS received on the first portion and the second portion.

In some aspects, the CST-RS may be received on a first CSI reference resource on the first portion, wherein the CSI-RS is received on a second CSI reference resource on the second portion, and wherein the CSI report is based on both the first CSI reference resource and the second CST reference resource.

In some aspects, the CST report may include a single channel estimation based on both the first CSI reference resource and the second CSI reference resource.

In some aspects, the UE may receive, from the base station, a report indication for a slot, wherein the UE determines to generate the CSI report based on both the first CST reference resource and the second CST reference resource for the slot based on the report indication.

In some aspects, the UE may receive, from the base station, a duplex status indication for a slot, wherein the UE determines to generate the CSI report based on both the first CSI reference resource and the second CSI reference resource for the slot based on the duplex status indication.

In some aspects, the UE may determine to generate the CSI report based on both the first CSI reference resource and the second CSI reference resource for a slot and transmit, to the base station, a report indication indicating that the CSI report is based on both the first CSI reference resource and the second CSI reference resource for the slot.

In some aspects, the CSI-RS may be received on a single CSI reference resource on both the first portion and the second portion, and wherein the CSI report may be based on the single CSI reference.

In some aspects, the CST-RS may not be received on resources of the single CSI reference resource on the second FD channel having the symbol.

In some aspects, the UE may determine that the CSI-RS is a tracking reference signal; determine that the CSI-RS is not received on resources of the second FD channel; and mute the CSI-RS received on resources of the first portion of the FD downlink channel and on resources of the second portion of the FD downlink channel.

In some aspects, the UE may receive a CSI resource configuration for the CSI reference resource identifying a frequency domain configuration for the single CSI reference resource.

In some aspects, the CSI resource configuration may include a bitmap identifying resources associated with the single CSI reference resource.

In some aspects, each bit of the bitmap may correspond to a resource block group of the single CSI reference resource and may identify whether the CSI-RS is received on the corresponding resource block group.

In some aspects, the UE may be configured with a plurality of resource bandwidths, wherein each resource bandwidth of the plurality of resource bandwidths is configured with a separate resource block group configuration, wherein the FD downlink channel is associated with an active resource bandwidth of the plurality of resource bandwidths, and wherein the bitmap corresponds to the resource block group of the active resource bandwidth.

In some aspects, the UE may have a maximum number of disjoint allocations that can be associated with the single CSI reference resource.

In some aspects, the UE may have as a minimum number of physical resource blocks that can be associated with each disjoint allocation of the single CSI reference resource.

In another aspect of the disclosure, a method, a computer-readable medium, and an apparatus are provided. The apparatus may be a UE. The UE may receive, from a base station, a full duplex (FD) downlink channel, the FD downlink channel being duplexed with a second FD channel, wherein the second FD channel has carrier frequencies between carrier frequencies of a first portion of the FD downlink channel and carrier frequencies of a second portion of the FD downlink channel; and receive, from the base station, a channel state information-reference signal (CSI-RS) on resources of the first portion of the FD downlink channel having a first symbol and on resources of the second portion of the FD downlink channel having the first symbol, wherein the LIE is configured with a first CSI reference resource comprising resources of the first portion of the FD downlink channel and resources of the second portion of the FD downlink channel, the first CSI reference resource does not include resources of the second FD channel, and the UE is configured with a second CSI reference resource comprising resources of the first portion of the FD downlink channel, resources of the second portion of the FD downlink channel, and resources of the second FD channel.

In some aspects, the UE may determine whether the CSI-RS is received on the first CSI reference resource or the second CSI reference resource; discard the CSI-RS upon determining that the CSI-RS is received on the second CSI reference resource: and transmit, to the base station, a channel state information (CSI) report based on the CSI-RS upon determining that the CSI-RS is received on the first CSI reference resource.

In some aspects, the UE may determine whether the CSI-RS is received on the first CSI reference resource or the second CSI reference resource; upon determining that the CSI-RS is received on the second CSI reference resource, discard a portion of the CSI-RS received on the resources of the second FD channel and transmit, to the base station, a channel state information (CSI) report based on the CSI-RS received on the first portion and the second portion of the FD downlink channel; and upon determining that the CSI-RS is received on the first CSI reference resource, transmit, to the base station, a channel state information (CSI) report based on the CSI-RS.

In another aspect of the disclosure, a method, a computer-readable medium, and an apparatus are provided. The apparatus may be a base station. The base station may transmit, to a user equipment (UE), a full duplex (FD) downlink channel, the FD downlink channel being duplexed with a second FD channel, wherein the second FD channel has carrier frequencies between carrier frequencies of a first portion of the FD downlink channel and carrier frequencies of a second portion of the FD downlink channel: transmit, to the UE, a channel state information reference signal (CSI-RS) (CSI-RS) on resources of the first portion of the FD downlink channel having a first symbol and on resources of the second portion of the FD downlink channel having the first symbol; and receive, from the UE, a channel state information (CSI) report based on the CSI-RS transmitted on the first portion and the second portion.

In some aspects, the CSI-RS may be transmitted on a first CSI reference resource on the first portion, wherein the CSI-RS is transmitted on a second CSI reference resource on the second portion, and wherein the CST report is based on both the first CSI reference resource and the second CSI reference resource.

In some aspects, the CSI report may include a single channel estimation based on both the first CST reference resource and the second CSI reference resource.

In some aspects, the base station may transmit, to the UE, a report indication for a slot, wherein the report indication indicates to the UE to generate the CSI report based on both the first CSI reference resource and the second CSI reference resource for the slot.

In some aspects, the base station may transmit, to the UE, a duplex status indication for a slot, wherein the duplex status indication indicates to the UE that the FD downlink channel is duplexed with the second FD channel, and wherein the UE generates the CSI report based on both the first CSI reference resource and the second CSI reference resource for the slot based on the duplex status indication.

In some aspects, the base station may receive, from the UE, a report indication indicating that the CSI report is based on both the first CSI reference resource and the second CSI reference resource for the slot.

In some aspects, the CSI-RS may be transmitted on a single CSI reference resource on both the first portion and the second portion, and wherein the CSI report is based on the single CSI reference.

In some aspects, the CST-RS may not be transmitted on resources of the single CSI reference resource on the second FD channel having the symbol.

In some aspects, the base station may transmit a CSI resource configuration for the CSI reference resource identifying a frequency domain configuration for the single CSI reference resource.

In some aspects, the CSI resource configuration may include a bitmap identifying resources associated with the single CSI reference resource.

In some aspects, each bit of the bitmap may correspond to a resource block group of the single CSI reference resource and identifies whether the CSI-RS is received on the corresponding resource block group.

In some aspects, the UE may be configured with a plurality of resource bandwidths, wherein each resource bandwidth of the plurality of resource bandwidths is configured with a separate resource block group configuration, wherein the FD downlink channel is associated with an active resource bandwidth of the plurality of resource bandwidths, and wherein the bitmap corresponds to the resource block group of the active resource bandwidth.

In some aspects, the UE may have a maximum number of disjoint allocations that can be associated with the single CSI reference resource.

In some aspects, the UE may have a minimum number of physical resource blocks that can be associated with each disjoint allocation of the single CSI reference resource.

In another aspect of the disclosure, a method, a computer-readable medium, and an apparatus are provided. The apparatus may be a base station. The base station may transmit, to a user equipment (UE), a full duplex (FD) downlink channel, the FD downlink channel being duplexed with a second FD channel, wherein the second FD channel has carrier frequencies between carrier frequencies of a first portion of the FD downlink channel and carrier frequencies of a second portion of the FD downlink channel; and transmit, to the UE, a channel state information-reference signal (CSI-RS) on resources of the first portion of the FD downlink channel having a first symbol and on resources of the second portion of the FD downlink channel having the first symbol, wherein the UE is configured with a first CSI reference resource comprising resources of the first portion of the FD downlink channel and resources of the second portion of the FD downlink channel, the first CSI reference resource does not include resources of the second FD channel, and the UE is configured with a second CSI reference resource comprising resources of the first portion of the FD downlink channel, resources of the second portion of the FD downlink channel, and resources of the second FD channel.

In some aspects, the base station may receive, from the UE, a channel state information (CSI) report based on the CSI-RS if the CSI-RS is transmitted on the first CSI reference resource.

In some aspects, the base station may receive, from the UE, if the CSI-RS is transmitted on the second CSI reference resource, a channel state information (CS) report based on the CSI-RS transmitted on the first portion and the second portion of the FD downlink channel but not based on the portion of the CSI-RS transmitted on the resources of the second FD channel; and receive, from the UE, if the CSI-RS is transmitted on the first CSI reference resource, a CSI report based on the CSI-RS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
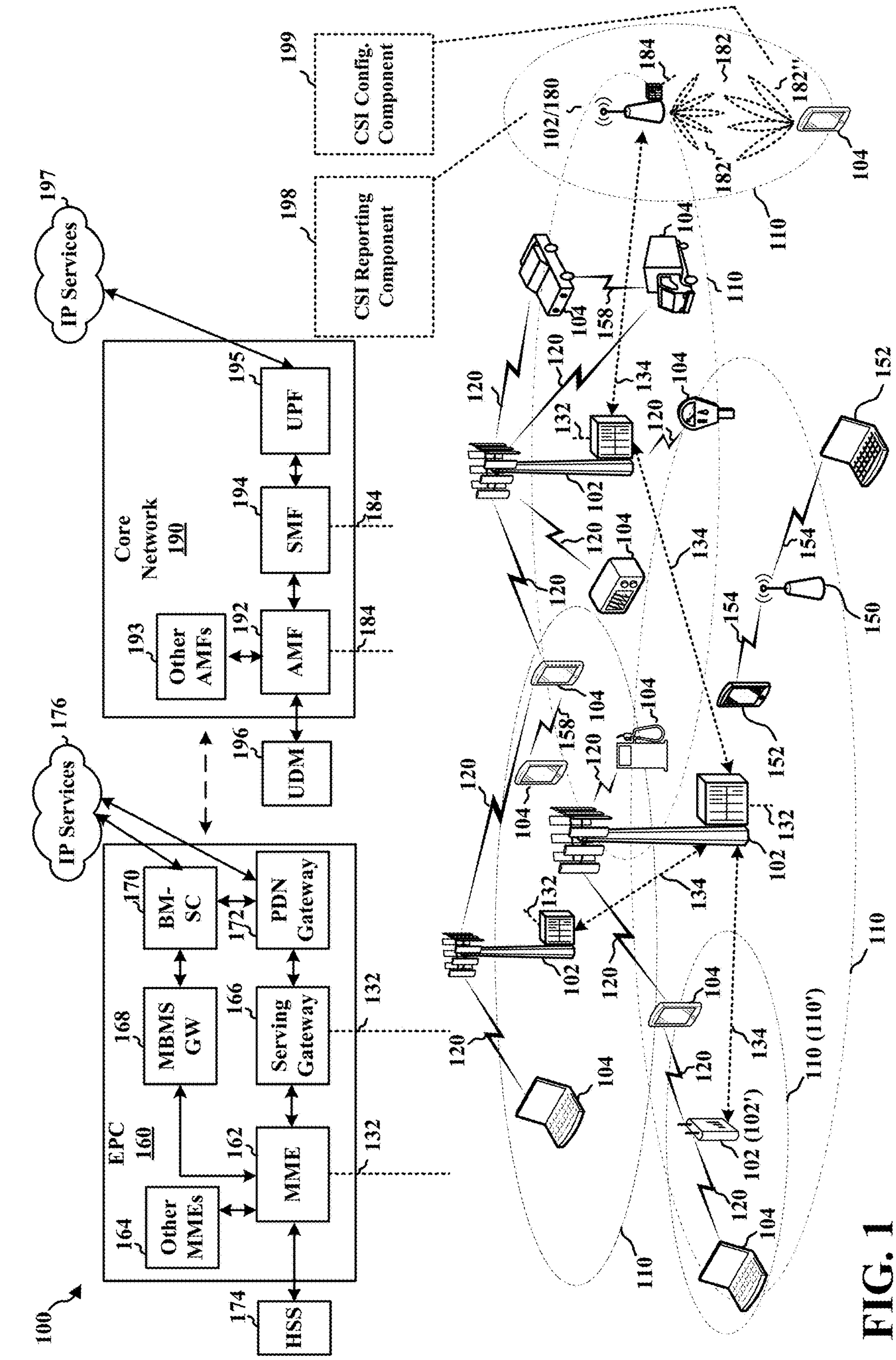
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (CPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DUUL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard. LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamfommnd signal from the base station 180 in one or more receive directions 182". The UE 104 may also transmit a beamformed signal to the base station 180 in one or more transmit directions. The base station 180 may receive the beamformnd signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may include a CSI configuration component 199 configured to configure the UE 104 for reporting CSI for non-contiguous downlink channels such as sub-band full duplexed downlink channels, and the UE 104 may include a CSI reporting component 198 configured to report the CSI for the non-contiguous downlink channels. Although the following description may be focused on 5G NR, the concepts described herein may be applicable to other similar areas, such as LTE. LTE-A, CDMA, GSM, and other wireless technologies.

Figures 2A, 2B, 2C, 2D:
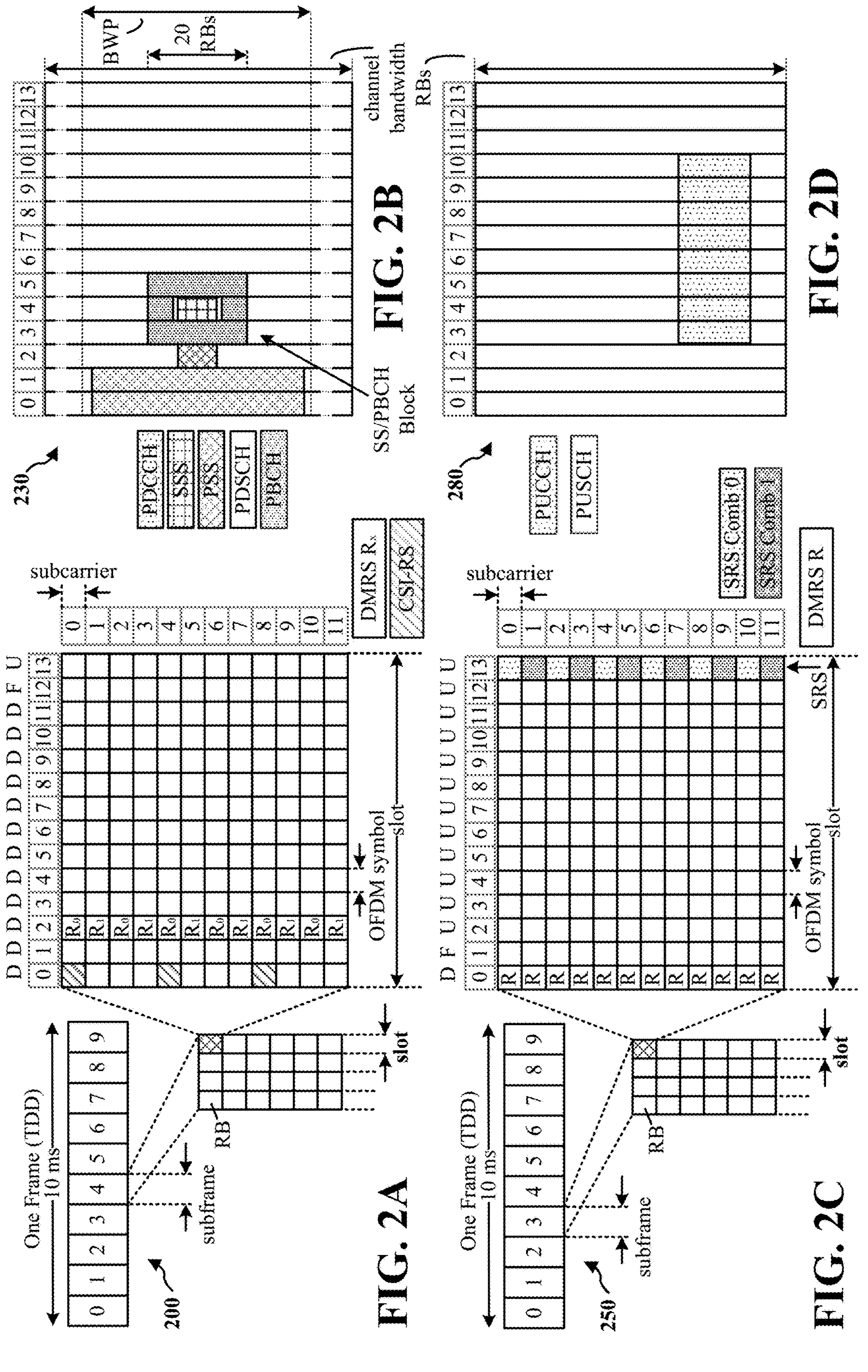
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SR). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transfonn (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^{\mu}$ slots/subframe. The subcarrier spacing and symbol length/duration are a function of the numerology. The subcarrier spacing may be equal to $2^{\mu}$ *15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may be associated with a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBS), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RD), and hybrid automatic repeat request (HARQ) ACK/NACK feedback. The PUCCH carries data, and may additionally be used to carry a buffer status report (BSR), a power headroom report (PHR), and/or UCI.

Figure 3:
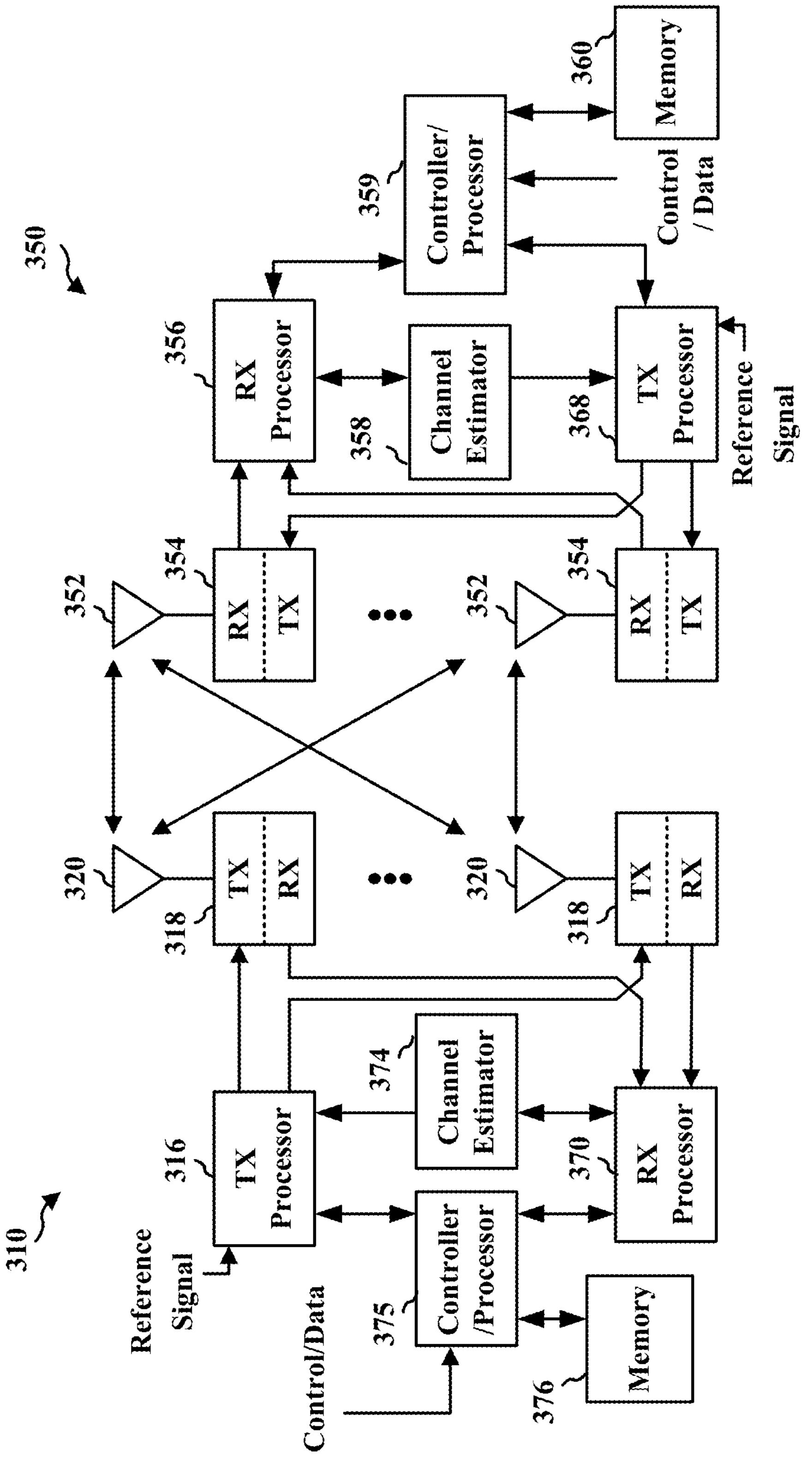
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging. RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification): RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF caner with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or LACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 4A:
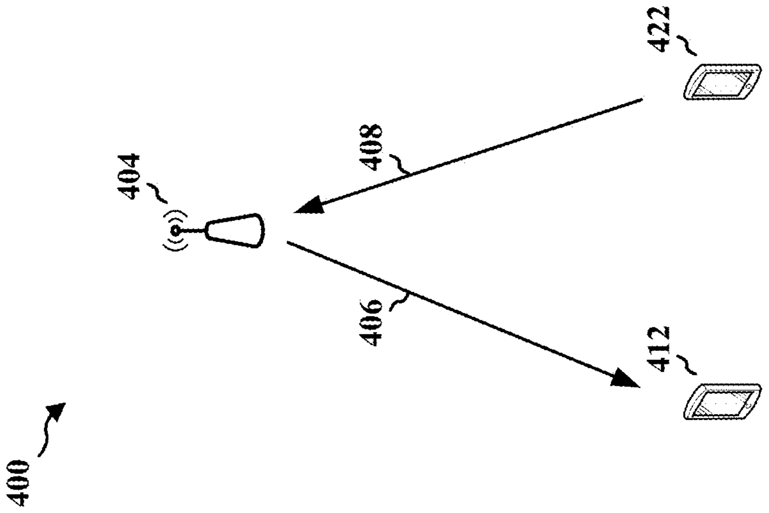
FIG. 4A is a diagram illustrating a base station communicating with a first UE and a second UE.

FIG. 4A is a diagram 400 illustrating a base station 404 communicating with a first UE 412 and a second UE 422. The base station 404 may transmit a downlink signal 406 to the first UE 412, and may simultaneously receive an uplink signal 408 from the second UE 422 an other resources. As the first UE 412 and the second UE 422 are only transmitting or receiving a single signal at a given time, they may be configured to operate in half duplex mode (e.g., uplink and downlink may be time division duplexed).

Figure 4B:
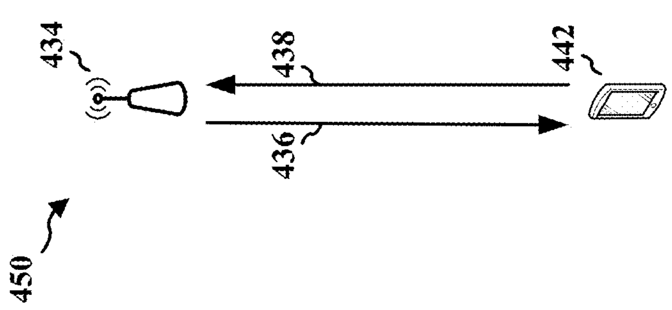
FIG. 4B is a diagram illustrating a UE utilizing full duplex communication with a base station.

FIG. 4B is a diagram 450 illustrating a UE 442 utilizing full duplex communication with a base station 434. The base station 434 may transmit a downlink signal 436 to the UE 442. The UE 442 may receive the downlink signal 436 from the base station 434 and may simultaneously transmit an uplink signal 438 to the base station 434. The downlink signal 436 and the uplink signal 438 may be frequency division duplexed (FDD) within the component carrier bandwidth (e.g., on resources having the same time but different carrier frequencies), and the UE 442 may be configured to operate in full duplex mode (e.g., configured to be able to transmit and to receive simultaneously).

In some aspects, the downlink signal 436 and the uplink signal 438 may be sub-band frequency division duplexed. A first set of frequency resources may be allocated to the downlink, and a second set of frequency resources may be allocated to the uplink. A guard band may be between the frequency resources allocated to the downlink and the frequency resources allocated to the uplink to prevent or reduce interference.

Figure 5:
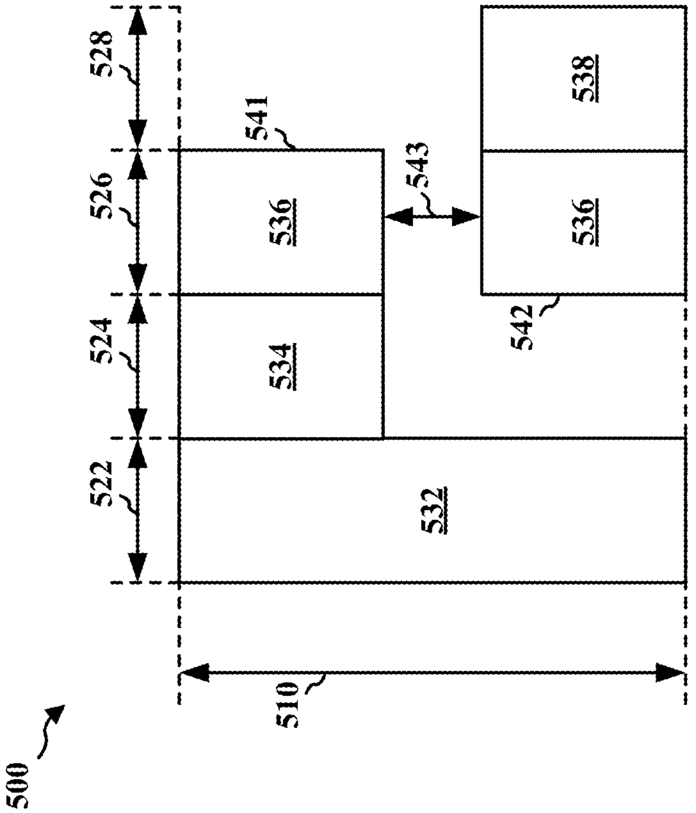
FIG. 5 is a diagram illustrating various resource bandwidth slot configurations.

FIG. 5 is a diagram 500 illustrating various resource bandwidth slot configurations. A UE may be configured with various resource bandwidths. For example, a base station may configure the resource bandwidths for a UE through RRC configuration messages. Uplink channels and downlink channels may have separate resource bandwidths. In each slot, a single resource bandwidth may be active. A resource bandwidth may identify the resources within the active bandwidth part allocated for a channel. For example, a resource bandwidth may identify resources allocated for a PDSCH in a given slot.

The base station may dynamically indicate to the UE which resource bandwidth to utilize for a channel in a given slot. For example, the base station may include an indication in DCI identifying the resource bandwidth to use for the channel in a slot. As the UE is already configured with the resource bandwidths, and switching between resource bandwidths does not require the UE to change the active bandwidth part, the UE may experience little to no delay associated with switching between resource bandwidths from one slot to the next.

As illustrated in FIG. 5, a UE may have an active bandwidth part 510, and may be configured with a first resource bandwidth 532, a second resource bandwidth 534, a third resource bandwidth 536, and a fourth resource bandwidth 538 for the active bandwidth part 510. A base station may allocate resources of the active bandwidth part 510 to a channel by identifying a resource bandwidth for the channel in a given slot. The base station may configure (e.g., dynamically configure) the UE to utilize the first resource bandwidth 532 in a first slot 522, to utilize the second resource bandwidth 534 in a second slot 524, to utilize the third resource bandwidth 536 in a third slot 526, and to utilize the fourth resource bandwidth 538 in a fourth slot 528.

Some resource bandwidths may span the entire active bandwidth part, indicating that the entire active bandwidth part is allocated for the channel. For example, the first resource bandwidth 532 may indicate the entire first slot 522 of the active bandwidth part 510 is allocated to the corresponding channel. Some resource bandwidths may only span a portion of the active bandwidth part, indicating that portion of the active bandwidth part is allocated for the channel. For example, the second resource bandwidth 534 and the fourth resource bandwidth 538 may indicate different portions of the second slot 524 and the fourth slot 528, respectively, that are allocated to the channel. The remaining portion of the active bandwidth part may be allocated to another channel.

Resource bandwidths may be noncontiguous. For example, the third resource bandwidth 536 identifies a first set of resources 541 and a second set of resources 542. A space 543 between the first set of resources 541 and the second set of resources 542 corresponds to resources which are not allocated to the channel in that slot. Accordingly, in the third slot 526, the first set of resources 541 and the second set of resources 542 may be allocated to the channel, but the resources between the first set of resources 541 and the second set of resources 542 may not be allocated to the channel. The base station may allocate the resources between the first set of resources 541 and the second set of resources 542 to another channel, resulting in a different channel being interposed between a first portion of the channel and a second portion of the channel in the frequency domain. For example, the resource bandwidths of FIG. 5 may identify resources allocated to a PDSCH, the first set of resources 541 and the second set of resources 542 may be allocated to the PDSCH in the third slot 526, and a the resources between the first set of resources 541 and the second set of resources 542 may be allocated to a PUSCH.

Figure 6:
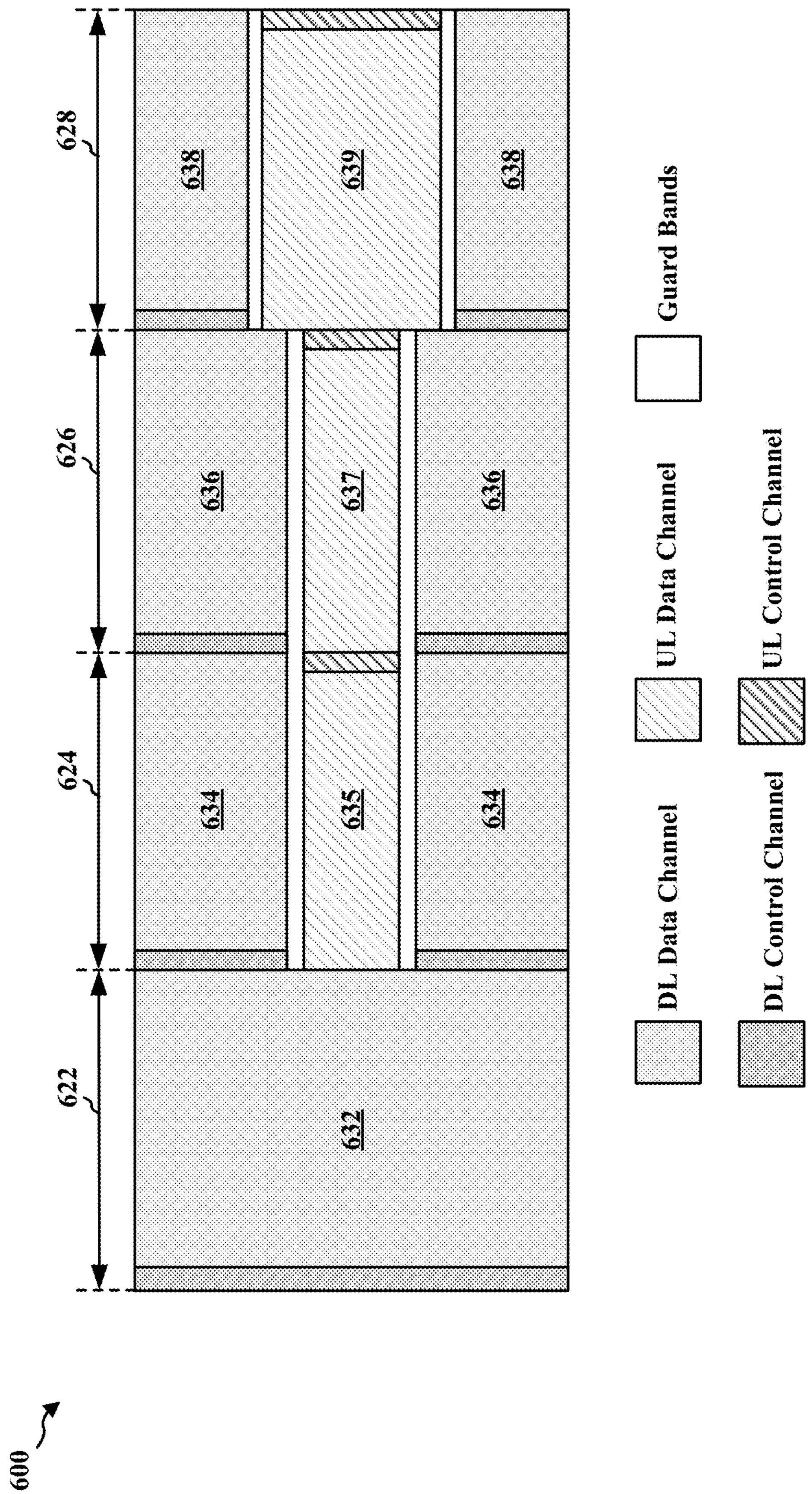
FIG. 6 is a diagram illustrating slot configurations with sub-band full duplexed downlink and uplink channels.

FIG. 6 is a diagram 600 illustrating slot configurations with sub-band full duplexed downlink and uplink channels. The downlink and uplink channels, including data channels and corresponding control channels, may be in an unpaired time division duplex spectrum. In some aspects, resource bandwidths, as described above, may be configured for the downlink channels in a first slot 622, a second slot 624, a third slot 626, and a fourth slot 628. Separate resource bandwidths may be configured for the uplink channels in the second slot 624, the third slot 626, and the fourth slot 628. A resource bandwidth identifying no resources may be configured for the uplink channels in the first slot 622, or no resource bandwidth may be configured for the uplink channels in the first slot 622.

In some aspects, the UE may be configured to operate in full duplex mode, and the downlink channels and the uplink channels may both be for the UE (e.g., as depicted in FIG. 4B). In some aspects, the UE may be configured to operate in half duplex mode, and the downlink channels may be for the UE and the uplink channels may be allocated to another UE, or the uplink channels may be for the UE and the downlink channels may be allocated to another UE (e.g., as depicted in FIG. 4A).

A downlink channel may include a downlink data channel and a downlink control channel. The uplink channels and the downlink channels may be frequency division duplexed in the component carrier bandwidth of a UE. The entire component carrier bandwidth may be allocated to a downlink data channel 632 and a corresponding downlink control channel in the first slot 622. In the second slot 624, the third slot 626, and the fourth slot 628, the downlink channels may be frequency division duplexed with uplink channels, with the uplink channels being allocated resources interposed between resources of the downlink channels. For example, in the second slot 624, resources allocated to an uplink data channel 635 may be interposed between resources allocated to a downlink data channel 634. In the third slot 626, resources allocated to an uplink data channel 637 may be interposed between resources allocated to a downlink data channel 636. In the fourth slot 628, resources allocated to an uplink data channel 639 may be interposed between resources allocated to a downlink data channel 638. Guard bands may be included between the resources allocated to the uplink channels and the resources allocated to the downlink channels in the second slot 624, the third slot 626, and the fourth slot 628.

In a system without sub-band full duplex downlink, downlink and uplink channels may be time division duplexed by allocating a first, second, and third slot to the downlink channels and by allocating a fourth slot to the uplink channels. In such a system, the number of resources allocated to the uplink channels and the number of resources allocated to the downlink channels may be the same or similar to the numbers of resources depicted in FIG. 6. In some aspects, by including resources allocated to both uplink channels and downlink channels in the same slot, latency may be improved. For example, uplink latency may be improved, as a UE may not need to wait for a slot allocated to uplink channels to transmit uplink data. In some aspects, by including resources allocated to both uplink channels and downlink channels in the same slot, coverage may be improved. For example, where fewer resources are being used to transmit uplink data in a given slot, a UE may be able to dedicate more transmit power to transmitting the uplink data on those resources in that slot.

Figure 7:
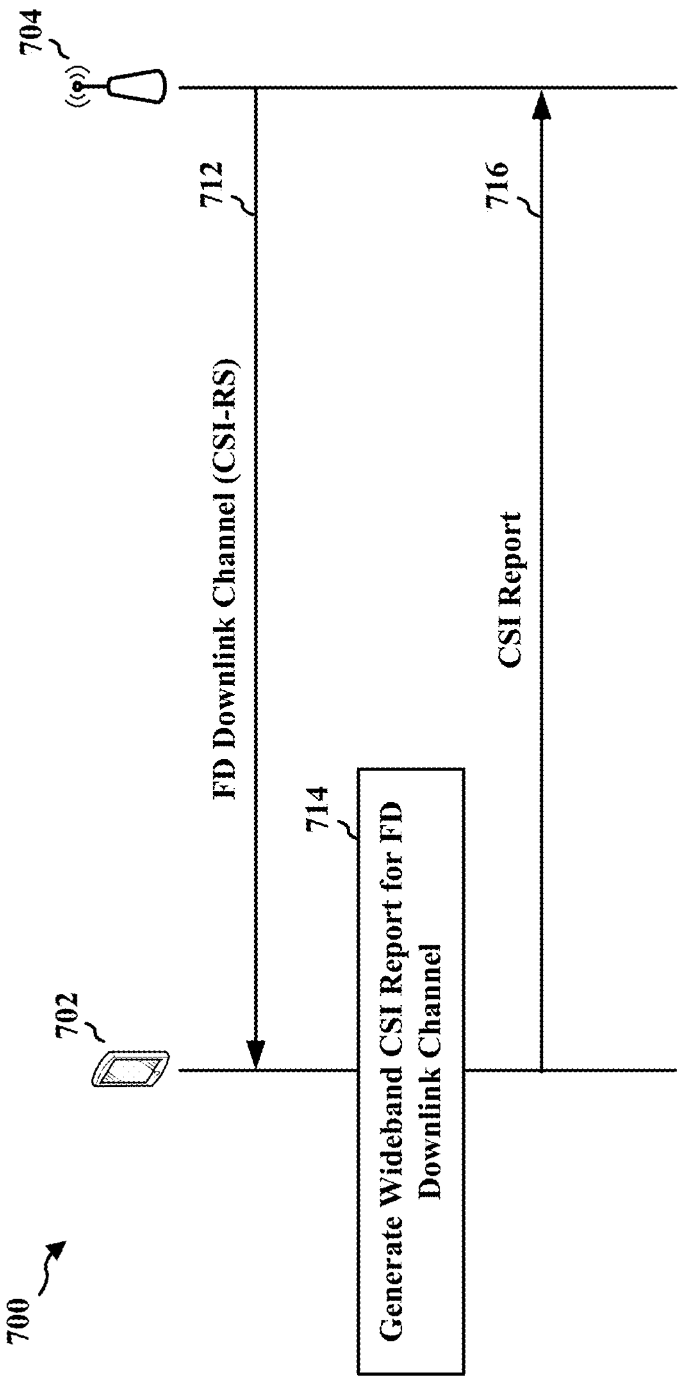
FIG. 7 is a communication flow diagram illustrating channel state information (CSI) reporting for a sub-band full duplexed downlink channel.

FIG. 7 is a communication flow diagram 700 illustrating channel state information (CST) reporting for a sub-band full duplexed downlink channel.

A base station 704 may transmit a sub-band full duplexed downlink channel 712 to a UE 702. The downlink channel 712 may be noncontiguous (e.g., another channel such as an uplink channel may be interposed between two portions of the downlink channel 712). The downlink channel 712 may include CSI-RS on one or more symbols. As the downlink channel 712 may be noncontiguous, the CSI-RS may not be included on resources which are not allocated to the downlink channel 712, and may therefore also not be contiguous. The UE 702 may receive the downlink channel 712 and the CST-RS.

As illustrated at 714, the UE 702 may generate a CSI report for the downlink channel 712. The CSI report may be based on the CST-RS. The CSI report may include channel quality information (CQI), rank indicator (RI), and/or a precoding matrix indicator (PMI) for the downlink channel 712. Although the downlink channel 712 may not be contiguous, the CSI report may include wideband CQI, single rank and/or PMI for the downlink channel 712. The UE 702 may transmit a single CSI report 716 to the base station 704, reporting the channel state information for the entire noncontiguous downlink channel 712.

Figure 8:
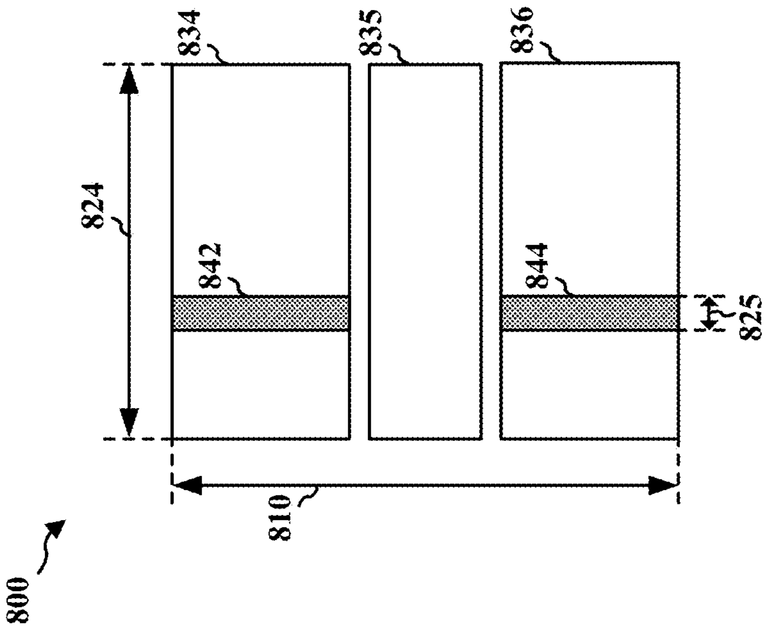
FIG. 8 is a diagram illustrating a channel state reference signal (CSI-RS) for a sub-band full duplexed downlink channel.

FIG. 8 is a diagram 800 illustrating a CSI-RS for a sub-band full duplexed downlink channel. A UE may have an active bandwidth part 810. In a first slot 824, the UE may have resources allocated for a noncontiguous downlink channel including a first portion 834 and a second portion 836, and for an uplink channel 835 between the first portion 834 and the second portion 836 of the downlink channel.

A base station may transmit the downlink channel to the UE, and may include CSI-RS on a symbol 825 of the first slot 824. The CSI-RS may be received on a first CSI reference resource (e.g., a CSI-RS resource or a CSI-IM resource) 842 and a second CSI reference resource 844. The first CSI reference resource 842 may be on the symbol 825 for the first portion 834 of the noncontiguous downlink channel, and the second CST reference resource 842 may be on the symbol 825 for the second portion 836 of the noncontiguous data channel 834.

The UE may generate a single CSI report linked to both the first CSI reference resource 842 and the second CSI reference resource 844. The report may include a single CQI. RI and/or PMI, providing a single wideband channel estimation for the downlink channel, even though the downlink channel is non-contiguous.

Figure 9:
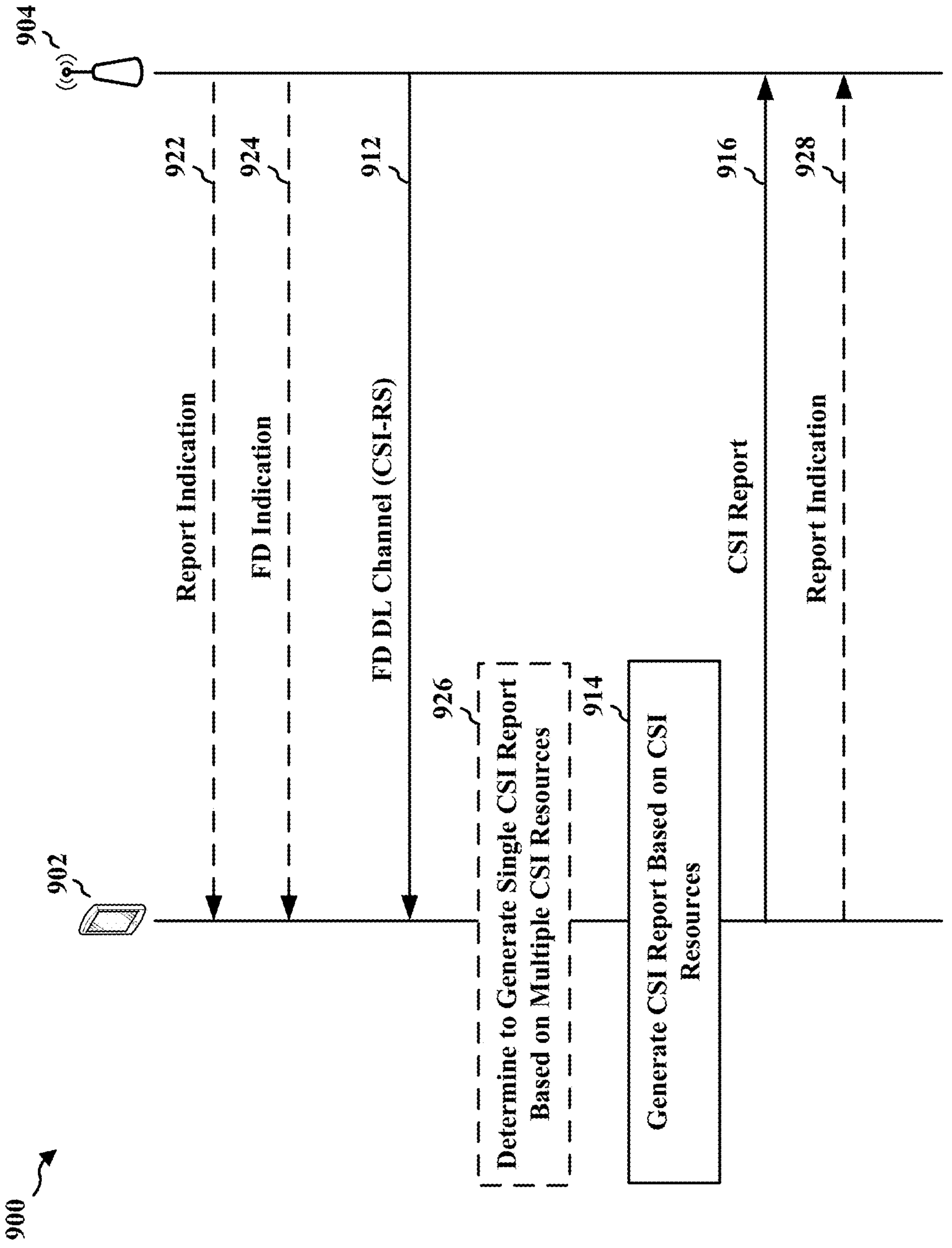
FIG. 9 is a communication flow diagram illustrating CSI reporting for a sub-band full duplexed downlink channel based on CSI-RS with multiple CSI reference resources.

FIG. 9 is a communication flow diagram 900 illustrating CST reporting for a sub-band full duplexed downlink channel based on CSI-RS with multiple CSI reference resources.

A base station 904 may transmit a sub-band full duplexed downlink channel 912 to a UE 902. The downlink channel 912 may be noncontiguous (e.g., another channel such as an uplink channel and guard band may be interposed between tow portions of the downlink channel 912. The downlink channel 912 may include CSI-RS transmitted on multiple CSI reference resources (e.g., CSI-RS or CST-IM), with one CSI reference resource on each noncontiguous portion of the downlink channel 912.

The UE 902 may receive the downlink channel 912 and the CSI-RS on the multiple CST reference resources. As illustrated at 914, the UE 902 may generate a single CSI report for the downlink channel 912 based on the multiple CSI reference resources. For example, the UE 902 may generate the CSI report as discussed above with respect to FIG. 8. The UE 902 may then transmit the CSI report 916 to the base station 904.

In some aspects, different slots can have different channel configurations. While the downlink channel 912 may be sub-band full duplexed in one slot, the downlink may not be sub-band full duplexed, or may only be half duplex in another band. For example, as shown in FIG. 6, the downlink channel 634 is sub-band full duplexed with the uplink channel 635 in the second slot 624, but the downlink channel 632 is only half duplex in the first slot 622. Referring again to FIG. 9, in some aspects, as illustrated at 926, the UE 902 may determine whether to generate a single CSI report based on multiple CSI reference resources (e.g., to report channel quality for a sub-band full duplex slot) or to generate a CSI report based on a single CSI reference resource (e.g., to report channel quality for a half-duplex slot). The UE 902 may have two CST slot sets defined, one for sub-band full duplex slots and one for non-full duplex slots (e.g., half duplex slots). A CSI reference resource may be defined for each CSI slot set, and the CSI report 916 may include a field indicating which CSI reference resource is being used for the CSI report 916.

In some aspects, at 926, the UE 902 may determine whether to generate the single CSI report based on multiple CSI reference resources based on a report indication 922. The base station 904 may transmit the report indication 922 to the UE 902. The report indication 922 may explicitly indicate to the UE 902 whether to utilize a CSI report format which reports channel quality based on a single CST reference resource, or whether to utilize a CSI report format linked with multiple CSI reference resources which reports channel quality based on the multiple CSI reference resources. For example, as the downlink channel 912 may be sub-band full duplex, the report indication 922 may direct the UE 902 to utilize a CST report format linked with multiple CSI reference resources. At 926, based on the report indication 922 directing the UE 902 to utilize a CSI report format linked with multiple CSI reference resources, the UE 902 may determine to generate the single CSI report based on multiple CSI reference resources in the downlink channel 912.

In some aspects, at 926, the UE 902 may determine whether to generate the single CSI report based on multiple CSI reference resources based on a full duplex (FD) indication 924. The base station 904 may transmit the FD indication 924 to the UE 902. The FD indication 924 may indicate whether a downlink channel associated with the FD indication 924 is sub-band full duplex or non-full duplex (e.g., half duplex) for an associated slot. For example, the downlink channel 912 may be sub-band full duplex, so the FD indication 924 may indicate to the UE 902 that the downlink channel 912 is sub-band full duplex. At 926, based on the FD indication 924 indicating that the downlink channel 912 is sub-band full duplex, the UE 902 may determine to generate the single CST report based on multiple CSI reference resources in the downlink channel 912.

In some aspects, at 926, the UE 902 may determine whether to generate the single CSI report for a slot based on the slot format for the slot (e.g., based on a slot format indication (SFI)). For example, the slot may be configured for sub-band full duplex, including resources allocated to an uplink channel and resources allocated to a downlink channel. However, the base station 904 may determine not to schedule an uplink data transmission in the uplink channel. The LE 902 may determine that the uplink channel is not being used in the slot, and may fall back to half duplex mode, generating a CSI report based on a single CSI reference for the entire sub-band full duplexed slot. The UE 902 may transmit a report indication 928 to the base station 904 along with the CSI report 916. The report indication 928 may be a CSI-RS resource indicator (CRI). The report indication 928 may indicate to the base station 904 whether the CSI report 916 was generated based on based on a single CSI reference resource or based on multiple CSI reference resources.

Figure 10:
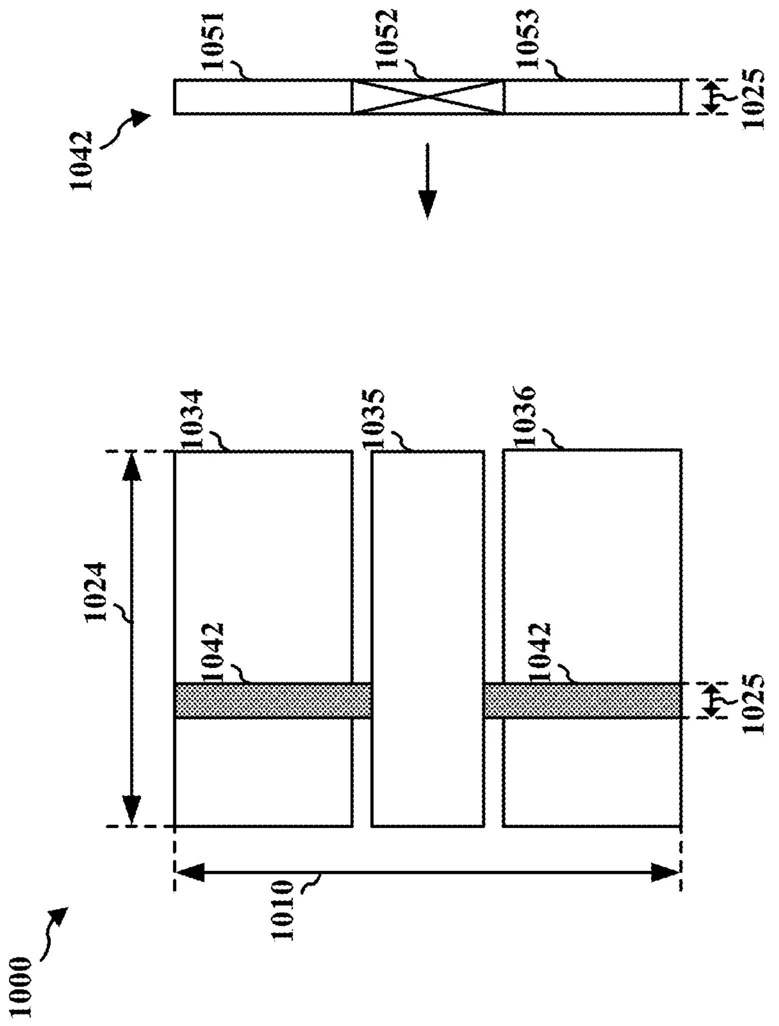
FIG. 10 is a diagram illustrating a CSI-RS for a fully duplexed downlink channel.

FIG. 10 is a diagram 1000 illustrating a CSI-RS for a sub-band full duplexed downlink channel. A UE may have an active bandwidth part 1010. In a first slot 1024, the UE may have resources allocated for a noncontiguous downlink channel including a first portion 1034 and a second portion 1036, and for an uplink channel 1035 between the first portion 1034 and the second portion 1036 of the downlink channel.

A base station may transmit the downlink channel to the UE, and may include CSI-RS on a symbol 1025 of the first slot 1024. The CSI-RS may be received on a single CSI reference resource 1042 for the downlink channel in the entire active bandwidth 1010 of the slot 1024. However, the base station may not transmit CSI-RS on resources of the CSI reference resource 1042 that are not included in the downlink channel (e.g., may puncture the resources or may mute the resources). For example, the base station may transmit CSI-RS on resources 1051 of the CSI reference resource 1042 in the first portion 1034 of the downlink channel and on resources 1053 in the second portion 1036 of the downlink channel, but may not transmit CSI-RS on resources 1052 of the CSI reference resource 1042 allocated to the uplink data channel 1035 or to the guard bands separating the uplink data channel 1035 from the first portion 1034 and the second portion 1036 of the downlink channel.

Figure 11:
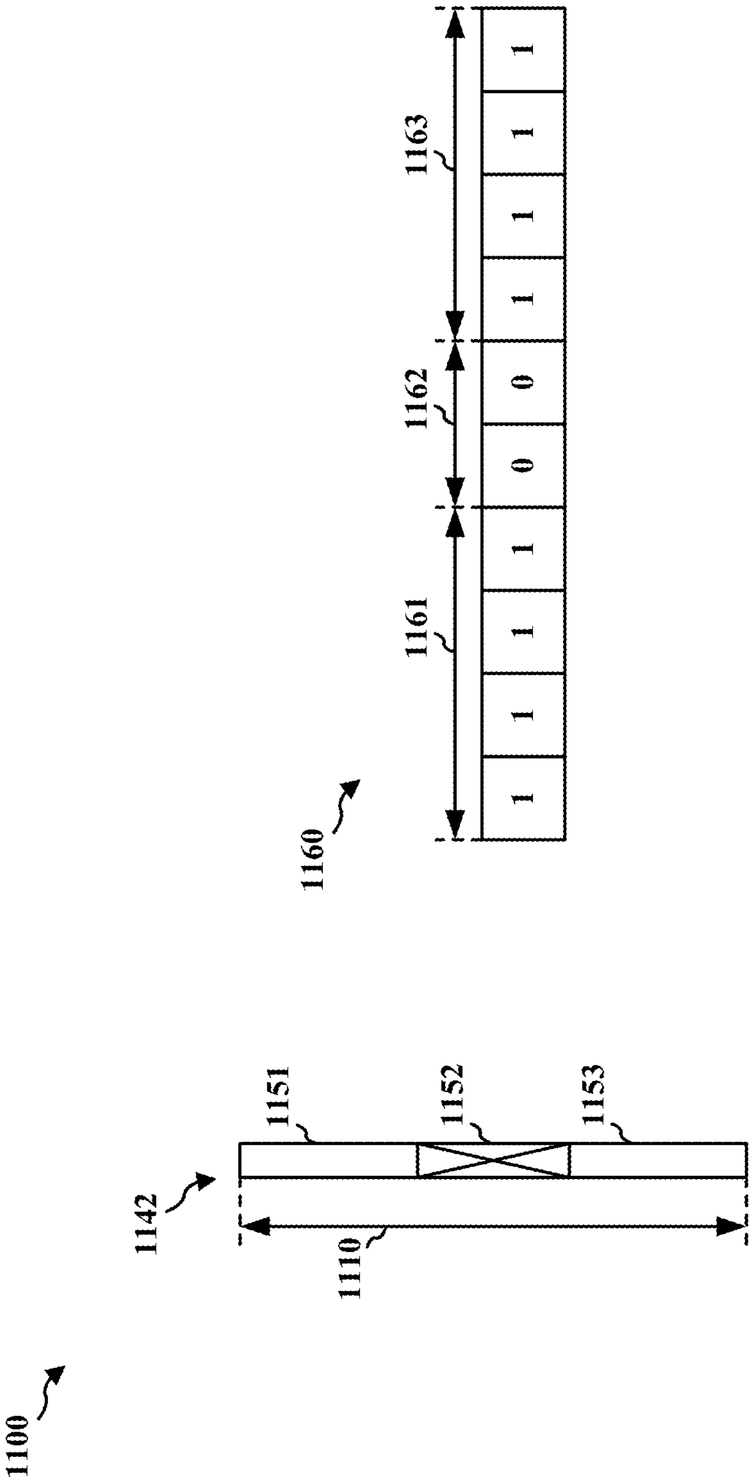
FIG. 11 is a diagram illustrating a CSI reference resource configuration bitmap.

FIG. 11 is a diagram 1100 illustrating a CSI resource configuration bitmap. As discussed with respect to FIG. 10, a base station may transmit CSI-RS on a single CSI reference resource 1142 for an active bandwidth part 1110 of a UE. The CSI reference resource 1142 may be for a sub-band full duplexed slot, and the base station may transmit the CSI-RS on a first set of resources 1151 and a second set of resources 1153 in the downlink channel, but may not transit the CSI-RS in a third set of resources 1152 allocated to the uplink data channel or to guard bands separating the uplink data channel from the downlink channel.

The base station may transmit a CSI resource configuration to the UE associated with the CSI reference resource 1142. In some aspects, the base station may transmit the CSI resource configuration in a RRC message. The CSI resource configuration may include a start resource block (RB) index and a number of RBs associated with the CSI reference resource 1142 which may define the resources of the CSI reference resource 1142. The CSI resource configuration may include a CSI resource configuration bitmap 1160. Each bit in the bit map may correspond to a set of resources of the CSI reference resource 1142. For example, each bit may correspond to one resource block (RB), or each bit may correspond to one resource block group (RBG). The bits corresponding to resources which are in the downlink channel and will receive CSI-RS may be set to "high" or "1." The bits corresponding to resources which are not in the downlink channel and will not receive CSI-RS may be set to "low" or "0." For example, referring to FIG. 11, in the CSI resource configuration bitmap 1160, a first set of bits 1161 may correspond to the first set of resources 1151, a second set of bits 1163 may correspond to the second set of resources 1153, and a third set of bits 1162 may correspond to the third set of resources 1152. The first set of bits 1161 and the second set of bits 1163 may be set to "high" or "1" because CSI-RS will be transmitted on the first set of resources 1151 and the second set of resources 1153. The third set of bits 1162 may be set to "low" or "0" because the third set of resources 1152 are allocated to the uplink channel or guard bands, and CSI-RS will therefore not be transmitted on the third set of resources 1152.

Based on the bitmap 1160 in the CSI resource configuration, when receiving CSI-RS on the CSI reference resource 1142, the UE may determine which resources contain the CSI-RS for the downlink. The UE may receive the CSI-RS for both of the noncontiguous portions of the downlink without having two separately defined CSI reference resources (e.g., a single start RB index and a single number of RBs define the CSI reference resource 1142).

In some aspects, as discussed above (e.g., with respect to FIG. 5), a UE may be configured with multiple resource bandwidths in the active bandwidth part for the UE. In some aspects, each resource bandwidth may be configured with a CST resource configuration bitmap, including sub-band full duplex resource bandwidths, in-band full duplex resource bandwidths, and non-full duplex resource bandwidths (e.g., half duplex resource bandwidths). For example, referring to FIG. 5, the first resource bandwidth 532 may be configured with a bitmap containing all "high" or "I" bits, indicating that the entire active bandwidth 510 may be utilized for a CSI reference resource received in a slot with the first resource bandwidth 532. The second resource bandwidth 534 and the fourth resource bandwidth 538 may be configured with bitmaps having one segment of "high" or "1" bits corresponding to the downlink resources in those resource bandwidths, and one segment of "low" or "0" bits corresponding to the other resources of the active bandwidth 510. The third resource bandwidth 536 may be configured with a bitmap having two segments of "high" or "1" bits separated by a segment of "low" or "0" bits. The UE may utilize the bitmap for a resource bandwidth when monitoring a CSI reference resource received in a slot having that resource bandwidth.

In some aspects, a CSI reference resource configuration bitmap may apply to all CSI reference resources in a bandwidth part. A separate CST resource configuration bitmap may be configured for different bandwidth parts, and the CSI resource configuration bitmap for a bandwidth part may be applied to all CSI reference resources whenever that bandwidth part is the active bandwidth part.

As discussed above, the bits of the CSI resource configuration bitmaps may correspond to RBGs. A RBG may be a set of RBs. In some aspects, the RBGs may be configured separately for each CSI reference resource. In some aspects, a first RBG configuration may apply for a first set of CSI reference resources, and a second RBG configuration may apply for a second set of CSI reference resources. In some aspects, the same RBG configuration may apply for all CSI reference resources associated with a CSI report.

A segment may refer to a set of bits of a bitmap having the same value. For example, referring again to FIG. 11, the CSI resource configuration bitmap 1160 may include three segments-a first segment corresponding to the first set of bits 1161, a second segment corresponding to the second set of bits 1163, and a third segment corresponding to the third set of bits 1162. Each segment may correspond to a portion of a non-contiguous channel, or a space between portions of a non contiguous channel. In some aspects, a CST resource configuration bitmap may have a maximum number of segments. For example, the maximum number of segments may be three. A UE may not be able to provide an accurate channel estimation based on CSI-RS received on a CSI reference resource having too many segments. In some aspects, a CSI resource configuration bitmap may have a minimum number of bits per segment.

A tracking reference signal may be transmitted on CSI reference resources in multiple slots, and one or more of the CSI reference resource may have a CSI resource configuration bitmap for that slot. However, a UE may not be able to accurately perform frequency or time tracking based on the tracking reference signal where the CSI resource configuration bitmap mutes or punctures bits of the tracking reference signal received in a slot. In some aspects, where the UE receives a tracking reference signal on a CSI reference resource and determines that one or more bits of the CSI resource configuration bitmap for the CSI reference resource for that slot are muted or punctured, the UE may treat all RBGs of that CS reference resource as muted or punctured. In some aspects, the UE may compare the muted bits of the CST reference resource to those in the other slots where the tracking reference signal is received. Where the CSI resource configuration bitmap includes muted bits which were not muted for the CSI reference resource where the tracking reference signal was received in a previous slot, the UE may treat the entire CSI reference resource for that slot as muted.

A UE may be configured with a parameter determining whether the UE has a time restriction for channel measurements. Based on this parameter, a UE may delay transmitting a CSI report based on a received CSI reference signal up until the CSI reference resource. In some aspects, a single CSI reference resource may be linked with both a sub-band full duplexed report and a non-full duplexed report. Where the UE transmits the CSI report at a later slot, the later slot may be a sub-band full duplexed slot or may be a non-full duplexed slot. In some aspects, the UE may delay transmitting a CST report based on a CST reference resource in a sub-band ful duplexed slot until another sub-band fully duplexed slot, or may delay transmitting a CSI report based on a CSI reference resource in a non-full duplex slot until another non-full duplex slot.

In some aspects, a UE may receive CSI-RS on a CSI reference resource configured for a non-full duplex slot on a slot that is configured as sub-band full duplex. In some aspects, the UE may discard the received CSI-RS entirely. In some aspects, the UE may apply the CSI resource configuration bitmap for the sub-band full duplex slot to the CSI-RS to ignore portions of the CSI-RS outside the downlink channel for that slot, and may utilize the remaining portions of the CSI-RS for channel estimation.

Figure 12:
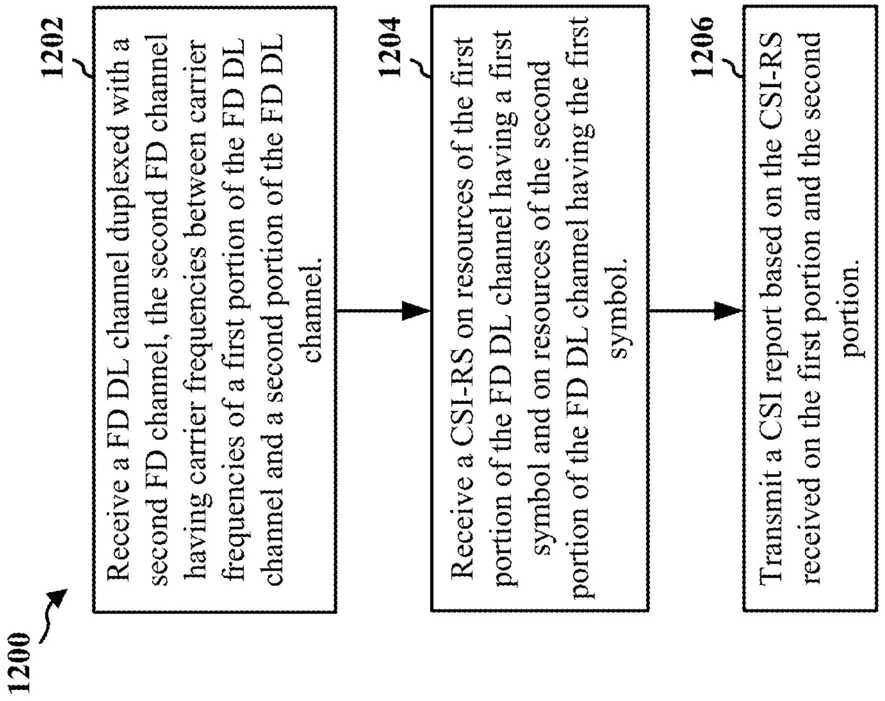
FIG. 12 is a flowchart of a method of wireless communication.

FIG. 12 is a flowchart 1200 of a method of wireless communication. The method may be performed by a UE (e.g., the UE 104, 702, 902).

At 1202, the UE may receive, from a base station, a full duplex (FD) downlink channel, the FD downlink channel being duplexed with a second FD channel, wherein the second FD channel has carrier frequencies between earner frequencies of a first portion of the FD downlink channel and carrier frequencies of a second portion of the FD downlink channel.

At 1204, the UE may receive, from the base station, a channel state information reference signal (CSI-RS) on resources of the first portion of the FD downlink channel having a first symbol and on resources of the second portion of the FD downlink channel having the first symbol.

At 1206, the UE may transmit, to the base station, a channel state information (CST) report based on the CSI-RS received on the first portion and the second portion.

In some aspects, a first CSI reference resource may be received on the first portion of the FD downlink channel, a second CSI reference resource may be received on the second portion, and the CST report may be based on both the first CSI reference resource and the second CSI reference resource. The CSI report may include a single channel estimation based on both the first CSI reference resource and the second CSI reference resource.

In some aspects, the UE may receive, from the base station, a report indication for a slot, wherein the UE determines to generate the CSI report based on both the first CSI reference resource and the second CSI reference resource for the slot based on the report indication. In some aspects, the UE may receive, from the base station, a duplex status indication for a slot, wherein the UE determines to generate the CSI report based on both the first CSI reference resource and the second CSI reference resource for the slot based on the duplex status indication. In some aspects, the UE may determine to generate the CSI report based on both the first CSI reference resource and the second CSI reference resource for a slot, and may transmit, to the base station, a report indication indicating that the CSI report is based on both the first CSI reference resource and the second CSI reference resource for the slot.

The CSI-RS may be received on a single CSI reference resource on both the first portion and the second portion, and wherein the CSI report is based on the single CSI reference. The CSI-RS may not be received on resources of the single CSI reference resource on the second FD channel having the symbol. The UE may receive a CSI resource configuration for the CSI reference resource identifying a frequency domain configuration for the single CSI reference resource. The CSI resource configuration may include a bitmap identifying resources associated with the single CSI reference resource. Each bit of the bitmap may correspond to a resource block group of the single CSI reference resource and may identify whether the CSI-RS is received on the corresponding resource block group. The UE may be configured with a plurality of resource bandwidths, wherein each resource bandwidth of the plurality of resource bandwidths is configured with a separate resource block group configuration, wherein the FD downlink channel is associated with an active resource bandwidth of the plurality of resource bandwidths, and wherein the bitmap corresponds to the resource block group of the active resource bandwidth.

The UE may have a maximum number of disjoint allocations that can be associated with the single CSI reference resource. The UE may have a minimum number of physical resource blocks that can be associated with each disjoint allocation of the single CSI reference resource.

In some aspects, the UE may determine that the CSI-RS is a tracking reference signal, may determine that the CSI-RS is not received on resource of the second FD channel, and may mute the CSI-RS received on resources of the first portion of the FD downlink channel and on resources of the second portion of the FD downlink channel.

Figure 13:
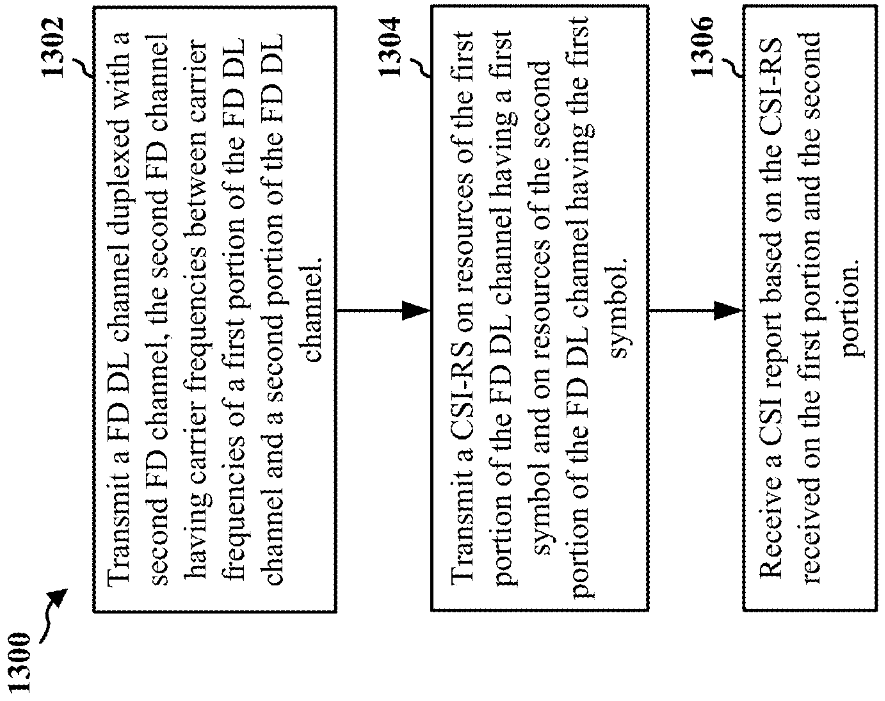
FIG. 13 is a flowchart of a method of wireless communication.

FIG. 13 is a flowchart 1300 of a method of wireless communication. The method may be performed by a base station (e.g., the base station 102, 180, 704, 904).

At 1302, the base station may transmit, to a user equipment (UE), a full duplex (FD) downlink channel, the FD downlink channel being duplexed with a second FD channel, wherein the second FD channel has carrier frequencies between carrier frequencies of a first portion of the FD downlink channel and carrier frequencies of a second portion of the FD downlink channel;

At 1304, the base station may transmit, to the UE, a channel state information reference signal (CSI-RS) on resources of the first portion of the FD downlink channel having a first symbol and on resources of the second portion of the FD downlink channel having the first symbol; and At 1306, the base station may receive, from the UE, a channel state information (CSI) report based on the CSI-RS transmitted on the first portion and the second portion.

In some aspects, a first CSI reference resource may be transmitted on the first portion of the FD downlink channel, a second CSI reference resource may be transmitted on the second portion, and the CSI report may be based on both the first CSI reference resource and the second CST reference resource. The CSI report may include a single channel estimation based on both the first CSI reference resource and the second CSI reference resource.

In some aspects, the base station may transmit, to the UE, a report indication for a slot, and the report indication may indicate to the UE to generate the CSI report based on both the first CSI reference resource and the second CST reference resource for the slot. In some aspects, the base station may transmit, to the UE, a duplex status indication for a slot, the duplex status indication may indicate to the UE that the FD downlink channel is duplexed with the second FD channel, and the UE may generate the CSI report based on both the first CSI reference resource and the second CSI reference resource for the slot based on the duplex status indication. In some aspects, the base station may receive, from the UE, a report indication indicating that the CSI report is based on both the first CSI reference resource and the second CSI reference resource for the slot.

The CSI-RS may be transmitted on a single CSI reference resource on both the first portion and the second portion, and the CST report may be based on the single CSI reference. The CSI-RS may not be transmitted on resources of the single CST reference resource on the second FD channel having the symbol. The base station may transmit a CSI resource configuration for the CSI reference resource identifying a frequency domain configuration for the single CSI reference resource. The CSI resource configuration may include a bitmap identifying resources associated with the single CSI reference resource. Each bit of the bitmap may correspond to a resource block group of the single CSI reference resource and may identify whether the CSI-RS is received on the corresponding resource block group. The UE may be configured with a plurality of resource bandwidths, wherein each resource bandwidth of the plurality of resource bandwidths is configured with a separate resource block group configuration, wherein the FD downlink channel is associated with an active resource bandwidth of the plurality of resource bandwidths, and wherein the bitmap corresponds to the resource block group of the active resource bandwidth.

The UE may have a maximum number of disjoint allocations that can be associated with the single CSI reference resource. The UE may have a minimum number of physical resource blocks that can be associated with each disjoint allocation of the single CSI reference resource.

Figure 14:
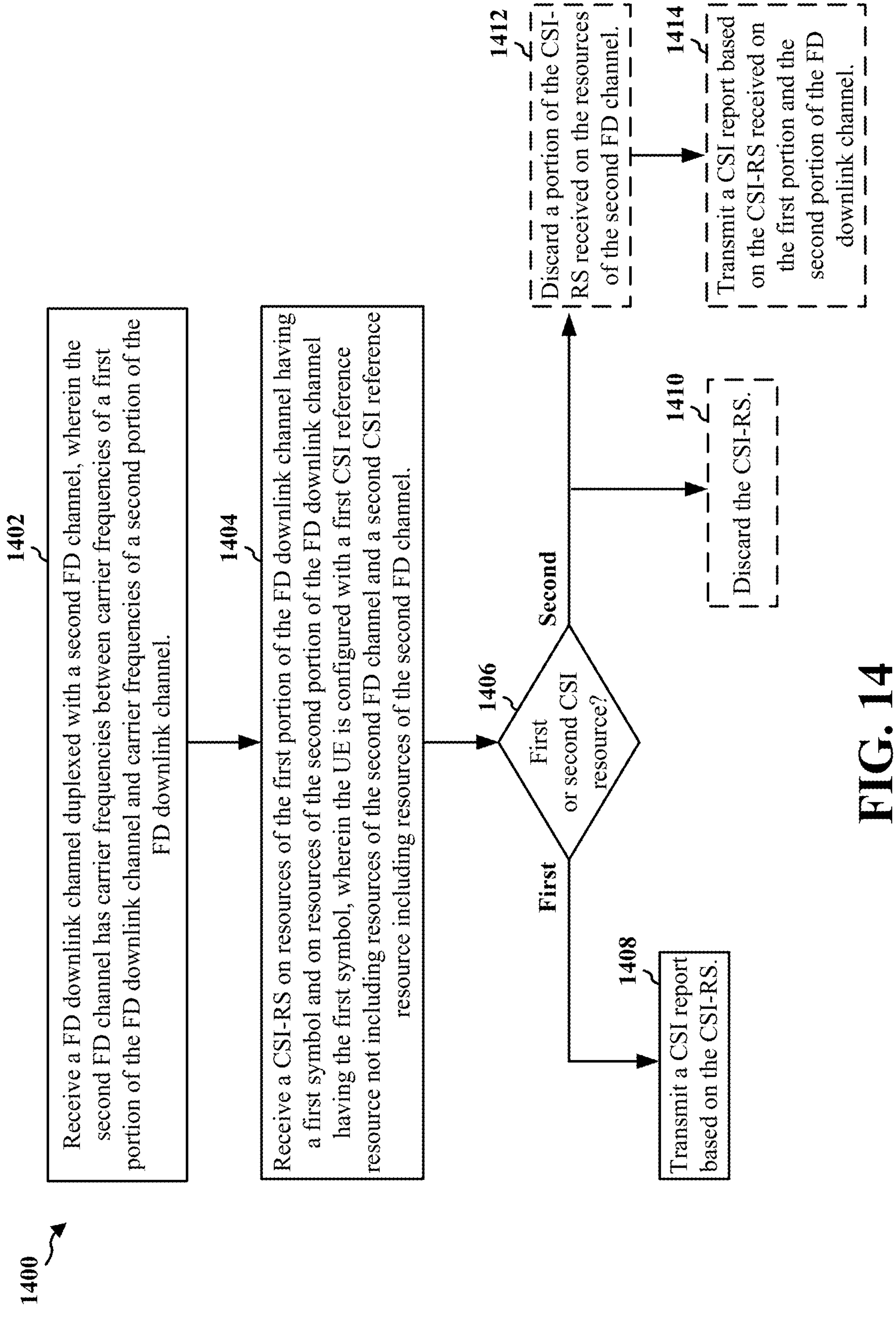
FIG. 14 is a flowchart of a method of wireless communication.

FIG. 14 is a flowchart 1400 of a method of wireless communication. The method may be performed by a UE (e.g., the UE 104, 702, 902).

At 1402, the UE may receive, from a base station, a full duplex (FD) downlink channel. The FD downlink channel may be duplexed with a second FD channel, wherein the second FD channel has carrier frequencies between carrier frequencies of a first portion of the FD downlink channel and carrier frequencies of a second portion of the FD downlink channel.

At 1404, the UE may receive, from the base station, a channel state information-reference signal (CSI-RS) on resources of the first portion of the FD downlink channel having a first symbol and on resources of the second portion of the FD downlink channel having the first symbol. The UE may be configured with a first CSI reference resource comprising resources of the first portion of the FD downlink channel and resources of the second portion of the FD downlink channel. The first CSI reference resource may not include resources of the second FD channel. The UE may be configured with a second CSI reference resource comprising resources of the first portion of the FD downlink channel, resources of the second portion of the FD downlink channel, and resources of the second FD channel.

At 1406, the UE may determine whether the CSI-RS is received on the first CSI reference resource or the second CSI reference resource.

At 1408, the UE may transmit, to the base station, a channel state information (CSI) report based on the CSI-RS upon determining that the CSI-RS is received on the first CSI reference resource.

In some aspects, at 1410, the UE may discard the CSI-RS upon determining that the CSI-RS is received on the second CSI reference resource. The UE may not transmit a CSI report based on the CSI-RS.

In some aspects, at 1412, the UE may, upon determining that the CSI-RS is received on the second CST reference resource, discard a portion of the CSI-RS received on the resources of the second FD channel. At 1414, the UE may transmit, to the base station, a channel state information (CSI) report based on the CSI-RS received on the first portion and the second portion of the FD downlink channel.

Figure 15:
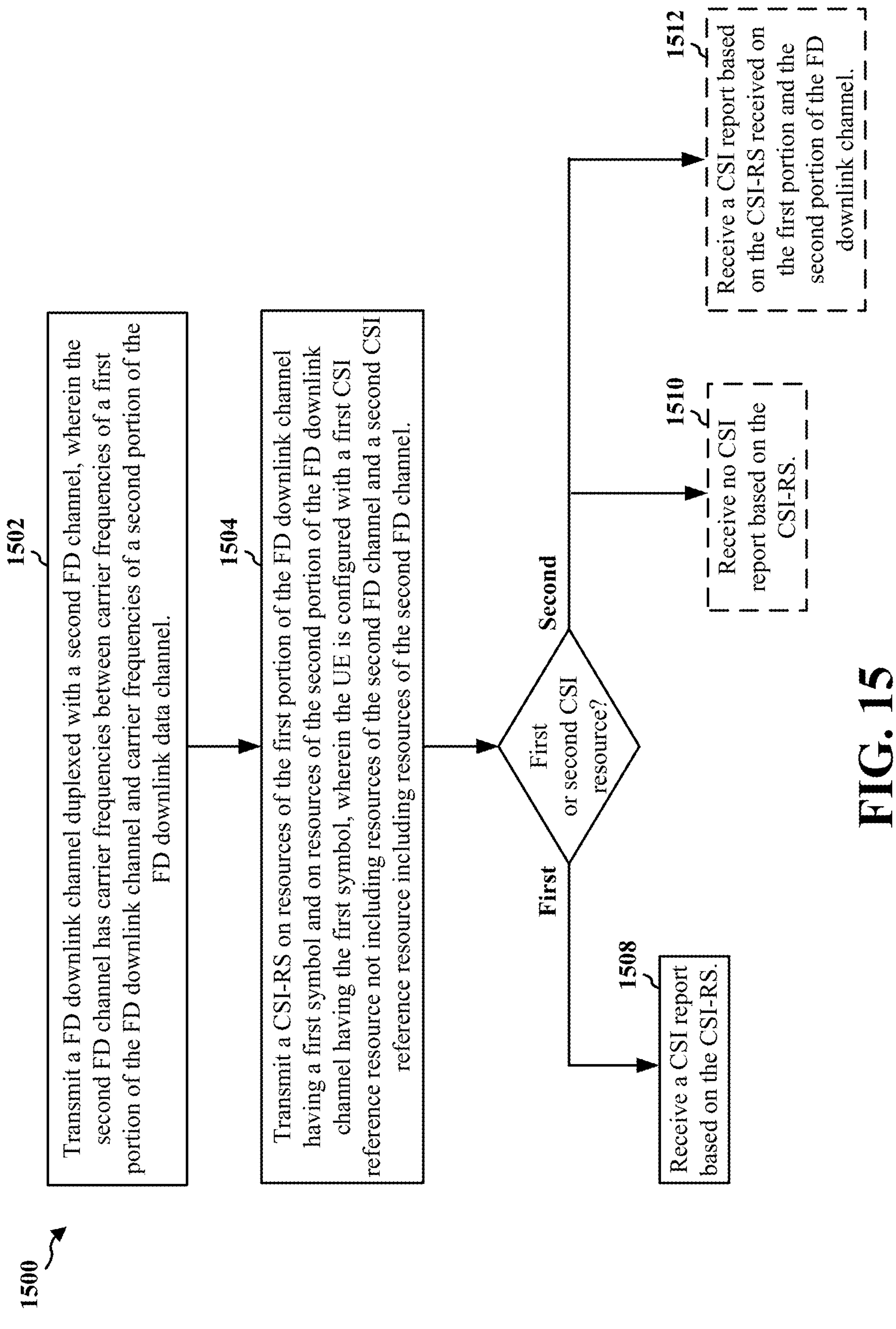
FIG. 15 is a flowchart of a method of wireless communication.

FIG. 15 is a flowchart 1500 of a method of wireless communication. The method may be performed by a base station (e.g., the base station 102, 180, 704, 904).

At 1502, the base station may transmit, to a user equipment (UE), a full duplex (FD) downlink channel. The FD downlink channel may be duplexed with a second FD channel, wherein the second FD channel has carrier frequencies between carrier frequencies of a first portion of the FD downlink channel and carrier frequencies of a second portion of the FD downlink channel.

At 1504, the base station may transmit, to the UE, a channel state information-reference signal (CSI-RS) on resources of the first portion of the FD downlink channel having a first symbol and on resources of the second portion of the FD downlink channel having the first symbol. The UE may be configured with a first CSI reference resource comprising resources of the first portion of the FD downlink channel and resources of the second portion of the FD downlink channel. The first CSI reference resource may not include resources of the second FD channel. The UE may be configured with a second CST reference resource comprising resources of the first portion of the FD downlink channel, resources of the second portion of the FD downlink channel, and resources of the second FD channel.

At 1508, the base station may receive, from the UE, a CSI report based on the CSI-RS if the CSI-RS is transmitted on the first CST reference resource.

In some aspects, at 1510, the base station may not receive a CSI report based on the CSI-RS is the CSI-RS is transmitted on the second CSI reference resource.

In some aspects, at 1512, if the CSI-RS is transmitted on the second CSI reference resource, the base station may receive, from the UE, a CSI report based on the CSI-RS transmitted on the first portion and the second portion of the FD downlink channel but not based on the portion of the CSI-RS transmitted on the resources of the second FD channel.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases. e.g., "when." do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C." "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B. or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:

receiving, from a base station, a full duplex (FD) downlink channel within an active downlink (DL) bandwidth part (BWP), the FD downlink channel being duplexed with a second FD channel in at least one sub-band full duplex (SBFD) symbol, wherein the second FD channel has carrier frequencies between carrier frequencies of a first portion of the FD downlink channel and carrier frequencies of a second portion of the FD downlink channel;

determining a mapping of a channel state information reference signal (CSI-RS) to resource blocks (RBs) based on an intersection of the active DL BWP and the at least one DL sub-band or the at least one other DL sub-band in the first symbol;

receiving, from the base station, the CSI-RS on a first CSI reference resource on the first portion of the FD downlink channel comprising at least one DL sub-band having a first symbol and on a second CSI reference resource on the second portion of the FD downlink channel comprising at least one other DL sub-band having the first symbol; and transmitting, to the base station, a channel state information (CSI) report based on the CSI-RS received on the first portion and the second portion.

2. The method of claim 1, wherein the CSI report is based on both the first CSI reference resource and the second CSI reference resource.

3. The method of claim 2, wherein the CSI report comprises a single channel estimation based on both the first CSI reference resource and the second CSI reference resource.

4. The method of claim 2, further comprising receiving, from the base station, a report indication for a slot, wherein the UE determines to generate the CSI report based on both the first CSI reference resource and the second CSI reference resource for the slot based on the report indication.

5. The method of claim 2, further comprising receiving, from the base station, a duplex status indication for a slot, wherein the UE determines to generate the CSI report based on both the first CSI reference resource and the second CSI reference resource for the slot based on the duplex status indication.

6. The method of claim 2, further comprising:

determining to generate the CSI report based on both the first CSI reference resource and the second CSI reference resource for a slot; and transmitting, to the base station, a report indication indicating that the CSI report is based on both the first CSI reference resource and the second CSI reference resource for the slot.

7. The method of claim 1, wherein the CSI-RS is received on a single CSI reference resource on both the first portion and the second portion, and wherein the CSI report is based on the single CSI reference.

8. The method of claim 7, wherein the CSI-RS is not received on resources of the single CSI reference resource on the second FD channel having the symbol.

9. The method of claim 8, further comprising:

determining that the CSI-RS is a tracking reference signal;

determining that the CSI-RS is not received on resources of the second FD channel; and muting the CSI-RS received on resources of the first portion of the FD downlink channel and on resources of the second portion of the FD downlink channel.

10. The method of claim 7, further comprising receiving a CSI resource configuration for the CSI reference resource identifying a frequency domain configuration for the single CSI reference resource.

11. The method of claim 10, wherein the CSI resource configuration comprises a bitmap identifying resources associated with the single CSI reference resource.

12. The method of claim 11, wherein each bit of the bitmap corresponds to a resource block group of the single CSI reference resource and identifies whether the CSI-RS is received on the corresponding resource block group.

13. The method of claim 12, wherein the UE is configured with a plurality of resource bandwidths, wherein each resource bandwidth of the plurality of resource bandwidths is configured with a separate resource block group configuration, wherein the FD downlink channel is associated with an active resource bandwidth of the plurality of resource bandwidths, and wherein the bitmap corresponds to the resource block group of the active resource bandwidth.

14. The method of claim 7, wherein the UE has a maximum number of disjoint allocations that can be associated with the single CSI reference resource.

15. The method of claim 7, wherein the UE has a minimum number of physical resource blocks that can be associated with each disjoint allocation of the single CSI reference resource.

16. A method of wireless communication at a user equipment (UE), comprising:

receiving, from a base station, a full duplex (FD) downlink channel within an active downlink (DL) bandwidth part (BWP), the FD downlink channel being duplexed with a second FD channel in at least one sub-band full duplex (SBFD) symbol, wherein the second FD channel has carrier frequencies between carrier frequencies of a first portion of the FD downlink channel and carrier frequencies of a second portion of the FD downlink channel;

determining a mapping of a channel state information reference signal (CSI-RS) to resource blocks (RBs) based on an intersection of the active DL BWP and the at least one DL sub-band or the at least one other DL sub-band in the first symbol; and receiving, from the base station, a channel state information-reference signal (CSI-RS) on resources of the first portion of the FD downlink channel comprising at least one DL sub-band having a first symbol and on resources of the second portion of the FD downlink channel comprising at least one other DL sub-band having the first symbol, wherein the UE is configured with a first CSI reference resource comprising resources of the first portion of the FD downlink channel and resources of the second portion of the FD downlink channel, the first CSI reference resource does not include resources of the second FD channel, and the UE is configured with a second CSI reference resource comprising resources of the first portion of the FD downlink channel, resources of the second portion of the FD downlink channel, and resources of the second FD channel.

17. The method of claim 16, further comprising:

determining whether the CSI-RS is received on the first CSI reference resource or the second CSI reference resource;

discarding the CSI-RS upon determining that the CSI-RS is received on the second CSI reference resource; and transmitting, to the base station, a channel state information (CSI) report based on the CSI-RS upon determining that the CSI-RS is received on the first CSI reference resource.

18. The method of claim 16, further comprising:

determining whether the CSI-RS is received on the first CSI reference resource or the second CSI reference resource;

upon determining that the CSI-RS is received on the second CSI reference resource, discarding a portion of the CSI-RS received on the resources of the second FD channel and transmitting, to the base station, a channel state information (CSI) report based on the CSI-RS received on the first portion and the second portion of the FD downlink channel; and upon determining that the CSI-RS is received on the first CSI reference resource, transmitting, to the base station, a channel state information (CSI) report based on the CSI-RS.

19. A method of wireless communication at a base station, comprising:

transmitting, to a user equipment (UE), a full duplex (FD) downlink channel within an active downlink (DL) bandwidth part (BWP), the FD downlink channel being duplexed with a second FD channel in at least one sub-band full duplex (SBFD) symbol, wherein the second FD channel has carrier frequencies between carrier frequencies of a first portion of the FD downlink channel and carrier frequencies of a second portion of the FD downlink channel;

determining a mapping of a channel state information reference signal (CSI-RS) to resource blocks (RBs) based on an intersection of the active DL BWP and the at least one DL sub-band or the at least one other DL sub-band in the first symbol;

transmitting, to the UE, a channel state information reference signal (CSI-RS) (CSI-RS) on a first CSI reference resource on the first portion of the FD downlink channel comprising at least one DL sub-band having a first symbol and on a second CSI reference resource on the second portion of the FD downlink channel comprising at least one other DL sub-band having the first symbol; and receiving, from the UE, a channel state information (CSI) report based on the CSI-RS transmitted on the first portion and the second portion.

20. The method of claim 19, wherein the CSI report is based on both the first CSI reference resource and the second CSI reference resource.

21. The method of claim 20, wherein the CSI report comprises a single channel estimation based on both the first CSI reference resource and the second CSI reference resource.

22. The method of claim 20, further comprising transmitting, to the UE, a report indication for a slot, wherein the report indication indicates to the UE to generate the CSI report based on both the first CSI reference resource and the second CSI reference resource for the slot.

23. The method of claim 20, further comprising transmitting, to the UE, a duplex status indication for a slot, wherein the duplex status indication indicates to the UE that the FD downlink channel is duplexed with the second FD channel, and wherein the UE generates the CSI report based on both the first CSI reference resource and the second CSI reference resource for the slot based on the duplex status indication.

24. The method of claim 20, further comprising receiving, from the UE, a report indication indicating that the CSI report is based on both the first CSI reference resource and the second CSI reference resource for the slot.

25. The method of claim 19, wherein the CSI-RS is transmitted on a single CSI reference resource on both the first portion and the second portion, and wherein the CSI report is based on the single CSI reference.

26. The method of claim 25, wherein CSI-RS is not transmitted on resources of the single CSI reference resource on the second FD channel having the symbol.

27. The method of claim 25, further comprising transmitting a CSI resource configuration for the CSI reference resource identifying a frequency domain configuration for the single CSI reference resource.

28. The method of claim 27, wherein the CSI resource configuration comprises a bitmap identifying resources associated with the single CSI reference resource.

29. The method of claim 28, wherein each bit of the bitmap corresponds to a resource block group of the single CSI reference resource and identifies whether the CSI-RS is received on the corresponding resource block group.

30. The method of claim 29, wherein the UE is configured with a plurality of resource bandwidths, wherein each resource bandwidth of the plurality of resource bandwidths is configured with a separate resource block group configuration, wherein the FD downlink channel is associated with an active resource bandwidth of the plurality of resource bandwidths, and wherein the bitmap corresponds to the resource block group of the active resource bandwidth.

31. The method of claim 25, wherein the UE has a maximum number of disjoint allocations that can be associated with the single CSI reference resource.

32. The method of claim 25, wherein the UE has a minimum number of physical resource blocks that can be associated with each disjoint allocation of the single CSI reference resource.

33. A method of wireless communication at a base station, comprising:

transmitting, to a user equipment (UE), a full duplex (FD) downlink channel within an active downlink (DL) bandwidth part (BWP), the FD downlink channel being duplexed with a second FD channel in at least one sub-band full duplex (SBFD) symbol, wherein the second FD channel has carrier frequencies between carrier frequencies of a first portion of the FD downlink channel and carrier frequencies of a second portion of the FD downlink channel;

determining a mapping of a channel state information reference signal (CSI-RS) to resource blocks (RBs) based on an intersection of the active DL BWP and the at least one DL sub-band or the at least one other DL sub-band in the first symbol; and transmitting, to the UE, a channel state information-reference signal (CSI-RS) on resources of the first portion of the FD downlink channel comprising at least one DL sub-band having a first symbol and on resources of the second portion of the FD downlink channel comprising at least one other DL sub-band having the first symbol, wherein the UE is configured with a first CSI reference resource comprising resources of the first portion of the FD downlink channel and resources of the second portion of the FD downlink channel, the first CSI reference resource does not include resources of the second FD channel, and the UE is configured with a second CSI reference resource comprising resources of the first portion of the FD downlink channel, resources of the second portion of the FD downlink channel, and resources of the second FD channel.

34. The method of claim 33, further comprising:

receiving, from the UE, a channel state information (CSI) report based on the CSI-RS if the CSI-RS is transmitted on the first CSI reference resource.

35. The method of claim 33, further comprising:

receiving, from the UE, if the CSI-RS is transmitted on the second CSI reference resource, a channel state information (CSI) report based on the CSI-RS transmitted on the first portion and the second portion of the FD downlink channel but not based on the portion of the CSI-RS transmitted on the resources of the second FD channel; and receiving, from the UE, if the CSI-RS is transmitted on the first CSI reference resource, a CSI report based on the CSI-RS.

* * * * *